United States Patent
Alastalo et al.

(10) Patent No.: US 7,215,658 B2
(45) Date of Patent: May 8, 2007

(54) APPARATUS, AND ASSOCIATED METHOD, FOR UTILIZING ANTENNA INFORMATION DETERMINATIVE OF ANTENNA OPERATION IN A WIRELESS MESH NETWORK

(75) Inventors: Ari Alastalo, Helsinki (FI); Mika Kasslin, Espoo (FI); Pekka Soininen, Helsinki (FI)

(73) Assignee: Nokia Corporation, Espoo (FI)

( * ) Notice: Subject to any disclaimer, the term of this patent is extended or adjusted under 35 U.S.C. 154(b) by 484 days.

(21) Appl. No.: 09/765,850

(22) Filed: Jan. 19, 2001

(65) Prior Publication Data

US 2002/0097700 A1 Jul. 25, 2002

(51) Int. Cl.
*H04Q 7/24* (2006.01)

(52) U.S. Cl. .................................. 370/338; 370/401
(58) Field of Classification Search ................ 370/335, 370/338, 349, 401
See application file for complete search history.

(56) References Cited

U.S. PATENT DOCUMENTS

| 5,341,375 | A | | 8/1994 | Buchholz et al. | |
|---|---|---|---|---|---|
| 6,298,053 | B1 | * | 10/2001 | Flammer et al. | 370/349 |
| 6,329,902 | B1 | * | 12/2001 | Lee et al. | 370/335 |
| 6,640,087 | B2 | * | 10/2003 | Reed et al. | 370/338 |

FOREIGN PATENT DOCUMENTS

EP 0999717 A2 10/2000

* cited by examiner

*Primary Examiner*—Salvatore Cangialosi
(74) *Attorney, Agent, or Firm*—Brown Raysman Millstein Felder Steiner

(57) ABSTRACT

Apparatus, and associated method, for facilitating use of an antenna assembly forming a portion of a communication station, such as a node of a wireless mesh network. Antenna information is determined and stored at a routing table of the node. The antenna information is combined with an IP address or other identifier of another node to which a data packet is to be communicated. The antenna information is utilized to define characteristics to be exhibited by the antenna assembly to best facilitate communication of the data packet between the nodes.

20 Claims, 3 Drawing Sheets

APPARATUS, AND ASSOCIATED METHOD, FOR UTILIZING ANTENNA INFORMATION DETERMINATIVE OF ANTENNA OPERATION IN A WIRELESS MESH NETWORK

The present invention relates generally to a manner by which to facilitate use of an antenna assembly forming a portion of a communication station, such as a node of a wireless mesh network. More particularly, the present invention relates to apparatus, and an associated method, by which to provide antenna information to be used by the communication station to utilize the antenna assembly in a manner by which best to effectuate communication of a data packet with another communication station. An IP address, or other identifier, contained in the data packet is mapped to the antenna information to identify in what manner the antenna assembly should be utilized to communicate the data packet. Antenna weighting values, beam angle selection, and sector antenna selection are all exemplary of antenna information which is mapped together with, or combined with, the IP address.

BACKGROUND OF THE INVENTION

A communication system is formed, at a minimum, of a sending station and a receiving station between which information is communicated. A communication channel is formed between the sending station and the receiving station. The information to be communicated by the sending station to the receiving station is communicated thereon. A wide variety of different types of communication systems have been developed and are regularly utilized to effectuate communication of information between the sending and receiving stations.

New types of communication systems have been developed and implemented as a result of advancements in communication technologies. Radio communication systems are exemplary of communication systems which have benefited from the advancements in communication technologies. Improvements to existing types of radio communication systems, and new types of radio communication systems, have been made possible as a result of the advancements in communication technologies.

In a radio communication system, communication channels are defined upon radio links formed between the sending and receiving stations operable therein. The radio link upon which the communication channels are formed is defined, at least in part, by frequencies of the electromagnetic spectrum. A radio communication system inherently permits greater communication mobility through the use of radio links, rather than conventional wireline connections.

Digital communication techniques, for instance, are amongst the advancements in communication technologies which have permitted the development and implementation of new types of communication systems. The use of digital communication techniques permits the communication capacity of a communication system to be increased as well as also to improve the quality levels of communications effectuated in the communication system.

When digital communication techniques are used, information which is to be communicated is digitized. In one technique, the digitized information is formatted into packets, and the packets are communicated to effectuate the communication. Individual ones, or groups, of the packets of data can be communicated at discreet intervals, and, once communicated, the packets of data can be concatenated together to recreate the informational content of the transmitted information.

A communication channel upon which packet data is communicated need not be dedicated solely for the communication of data by one sending station to one receiving station, as conventionally required in circuit-switched communications. Instead, a single channel can be shared amongst a plurality of different sending and receiving station pairs. Because a single channel can be utilized to effectuate communications by the plurality of pairs of communication stations, improved communication capacity is possible.

A wireless mesh network is a radio communication system which can be constructed to provide for the communication of packet data. A wireless mesh network typically includes a plurality of nodes, each node capable of communicating with at least one other node. A wireless mesh network is implemented, for instance, as a fixed wireless access (FWA) system capable of communicating broadband data between fixed-site communication stations which form the nodes. Proposals have been set forth to standardize certain operations of certain wireless mesh networks. One proposed standard, an IEEE 802.16 standard pertains to wireless mesh networks.

Implementation of a wireless mesh network is possible in an unlicensed frequency band such as the frequency band located at 5 GHz. More than one wireless mesh network might be installed over a common geographical area due to the unlicensed nature of the 5 GHz band. Also, other types of radio communication systems might also be installed at the same geographical area to be operable, or to have frequency harmonics which have significant components, at the 5 GHz band.

The unstructured nature of an unlicensed band, such as the 5 GHz band, provides significant design freedom in the design of a communication system to be operable within the frequency band. However, the unlicensed nature of the band also increases the possibility that signals generated during operation of one communication system within the frequency band might generate signals which interfere with operation of another communication system operable at the same frequency band.

Use of frequency levels within the allocated band which exhibit lowest amounts of interference would best ensure that communication qualities would not be degraded. Appropriate selection of the frequency levels would be required. And, reselection of the frequency levels would also be required if the frequencies of the interference changes over time.

A manner by which dynamically to select frequencies upon which to define channels in a wireless mesh network operable in an unlicensed frequency band, or elsewhere, would be advantageous. Existing proposals related to standardization of wireless mesh networks, however, do not generally provide for dynamic frequency selection.

If a manner could be provided by which better to dynamically select frequency levels upon which to define radio channels, improved communications would be possible.

Advancements in communication technologies also include advancements in antenna technologies. Antenna assemblies formed of multiple antenna transducer elements, for instance, are available by which to form antenna patterns of selectable characteristics. Through appropriate selection of the antenna pattern, data to be communicated between nodes of a wireless mesh network, or between other communication stations of other radio communication systems, is better able to be effectuated.

For instance, digital beam forming techniques permit any of many radiation patterns to be formed by an array of antenna transducer elements. Antenna assemblies capable of creating steerable-beam antenna patterns also provide a manner by which better to effectuate communications between nodes of a wireless mesh network. And, use of selected ones of sector antenna transducer assembly also provides a manner by which better to effectuate communication of data between nodes of a wireless mesh network.

To properly utilize many antenna assemblies, information must be available by which to select to the antenna patterns to be exhibited by the antenna assembly. The antenna characteristics appropriate for communications between a first pair of nodes might well be substantially different than the antenna characteristics which should be used to effectuate communications between another pair of nodes. If a manner could be provided by which better to provide the antenna information to permit appropriate selection of the antenna characteristics of the antenna assembly, improved communication qualities of the communications in the communication system would result.

It is in light of this background information related to communications in a radio communication system, such as a wireless mesh network, that the significant improvements of the present invention have evolved.

SUMMARY OF THE INVENTION

The present invention, accordingly, advantageously provides apparatus, and an associated method, by which to facilitate use of an antenna assembly forming a portion of a communication station, such as a node of a wireless mesh network.

Operation of an embodiment of the present invention provides a manner by which to provide antenna information to be used by the communication station to utilize the antenna assembly to best effectuate communication of a data packet.

In one aspect of the present invention, an IP address, or other identifier, contained in a data packet is mapped to the antenna information to identify in what manner the antenna assembly should be utilized to communicate the data packet.

In one implementation, a manner is provided by which to provide the antenna information to a node, such as a wireless router which includes an antenna assembly as a portion thereof. The antenna information is used to select antenna characteristics to transmit packet data to another node. Associated with the other nodes to which the packet data is to be communicated is antenna information, to be used to select antenna characteristics of the antenna assembly of the node.

The antenna information associated with the identifier, such as an IP address of the node to which the data is to be communicated, is used to select the characteristics which are to be exhibited by the antenna assembly during transmission of the packet data. By selecting the characteristics of the antenna assembly to correspond with the address to which the data is to be communicated. The antenna characteristics are permitted to be optimized for communication to the particular location identified by the IP address of the data packets.

When the antenna assembly is formed of an antenna array capable of beam forming operations, weighting values to be applied to antenna transducer elements of the antenna assembly form the antenna information associated with the IP address to which the data packets are directed.

When the antenna assembly is formed of a collection of antenna sector arrays for generating radiation patterns extending in separate sectors, the antenna information associated with the IP address selects which of the antenna sector arrays is to be utilized to communicate the packet data.

When the antenna assembly utilizes a steerable-beam approach the antenna information associated with the IP address to which the packet data is to be communicated is angular information in which the antenna beam pattern is to be directed.

In these and other aspects, therefore, apparatus, and an associated method, is provided for a wireless mesh network having a first node and at least a second node. The first node is identified by a first identifier, and the second node is identified by a second identifier. The first node has a first antenna transducer assembly at which to transduce a data packet communicated between the first and at least second nodes. The data packet includes data values of at least a selected one of the first and second identifiers. Indication of antenna transducer-related information by which to direct operation of the first antenna transducer assembly is facilitated, thereby to efficiently communicate the data packet between the first and at least second nodes. A mapper is coupled to receive an indication of the values of the selected one of the first and second identifiers included to form a portion of the data packet. The mapper maps the values of the selected one of the first and second identifiers to mapped values. The mapped values include values representative of the antenna transducer-related information, and the mapped values are incorporate into the data packet. Thereby, identified with the data packet is the antenna transducer-related information by which to direct operation of the first antenna transducer assembly.

DETAILED DESCRIPTION OF THE INVENTION

Figure 1:
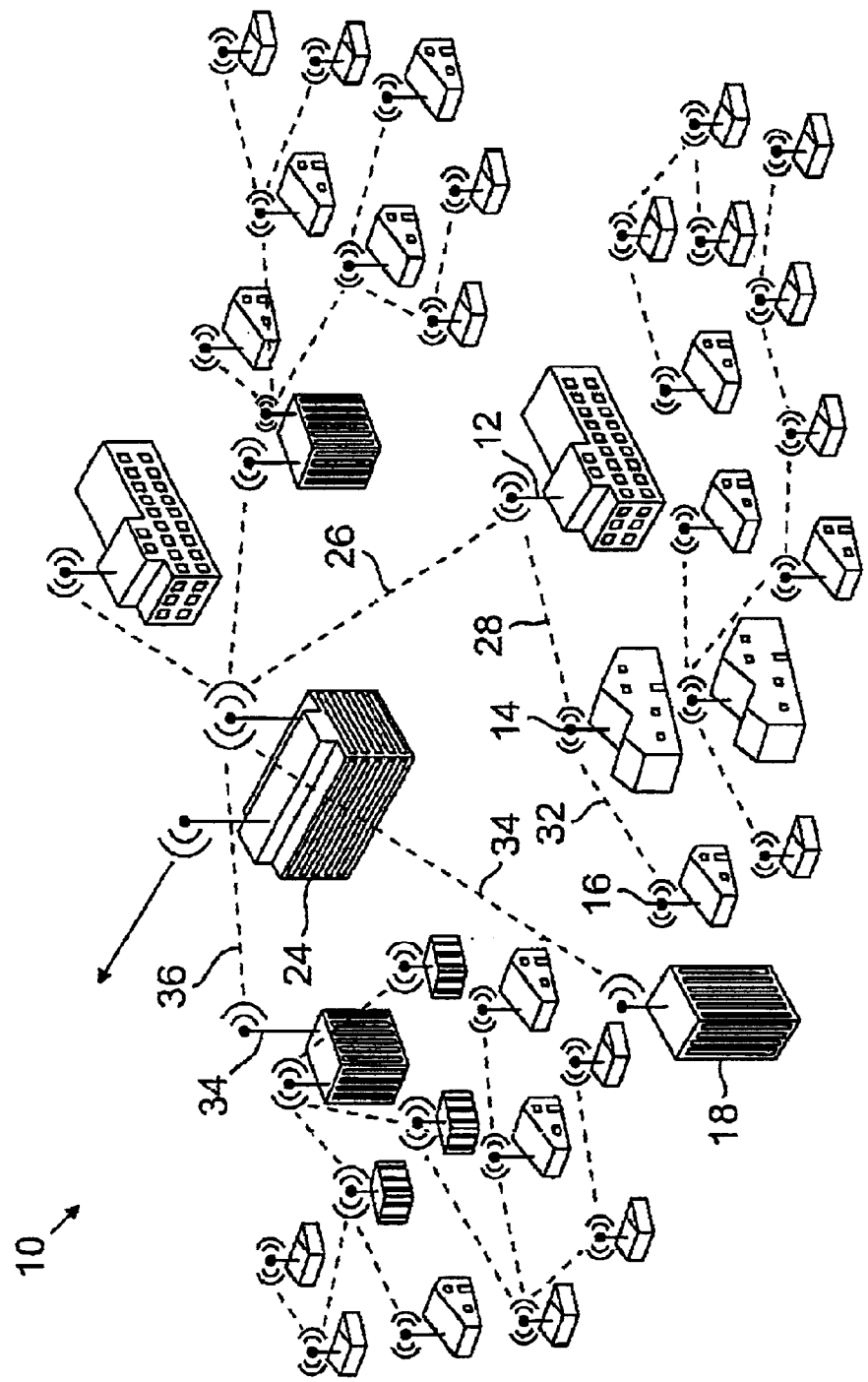
FIG. 1 illustrates a representation of an exemplary wireless mesh network in which an embodiment of the present invention is operable.

FIG. 1 illustrates a wireless mesh network, shown generally at 10, in which an embodiment of the present invention is operable. The wireless mesh network includes a plurality of nodes, of which the nodes referenced by 12, 14, 16, 18, and 22 are exemplary. Any of the nodes are able to communicate, either directly or by a hopping pattern, with a network management station 24 by way of one or more radio links.

The node 12 is coupled to the network management station 24 by way of the radio link 26, the node 14 is coupled to the station 24 by way of radio links 26 and 28, the node 16 is coupled to the station 24 by way of a radio links 26, 28, and 32, the node 18 is coupled to the network management station 24 by way of a radio link 34, and the node 22 is coupled to the network management station by way of a radio link 36. Other radio links with other nodes and with the network management station can similarly be shown.

Between individual ones of the nodes 12–22, local communications are effectuable by way of local radio links. The conditions of the radio links must exhibit appropriate characteristics, such as low levels of interference, to ensure that communication quality levels of communications between nodes, and also with the network management station, are of acceptable levels. Directional antenna devices are utilized pursuant to operation of an embodiment of the present invention to facilitate communications at acceptable communication quality levels. Radiation patterns formed by the antenna devices permit the energy levels of the radiation patterns to be selected to overcome interfering signals and also to assist in the transmission and reception of communication signals.

In the exemplary implementation, the wireless mesh network is operable in an unlicensed frequency band, such as the 5 GHz band. Due to the unstructured nature of communications of communication systems installed in unlicensed bands, there is an increased possibility that interfering signals generated during operation of another communication system might disrupt, or otherwise interfere with, communications effectuated during operation of the wireless mesh network.

Operation of an embodiment of the present invention provides a manner by which to provide antenna information related to antenna characteristics to be exhibited by an antenna assembly at a node of the wireless mesh network during communication of data packets between the nodes of the wireless mesh network. Through utilization of the antenna information, optimal antenna characteristics are caused to be exhibited by the antenna assembly, thereby to facilitate communication of data packets forming communication signals during communication operations between nodes of the network.

Figure 2:
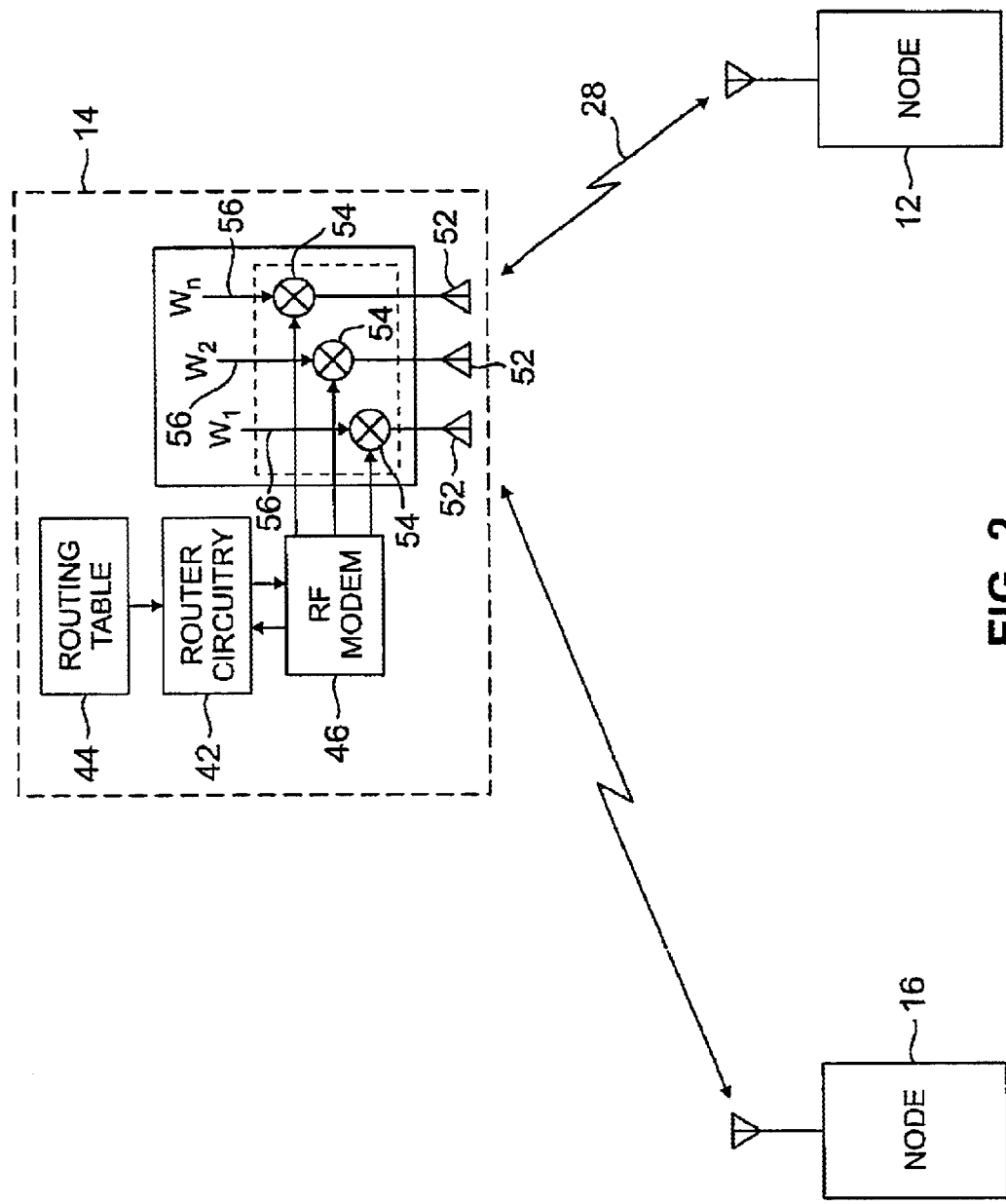
FIG. 2 illustrates a functional block diagram of portions of the wireless mesh network shown in FIG. 1, operable pursuant to an embodiment of the present invention.

FIG. 2 illustrates portions of the wireless mesh network 10. Here, three nodes, nodes 12, 14, and 16, of the mesh network are shown. Communication channels defined upon radio links formed between the respective nodes permit the communication of information between the nodes. Here, again, the radio link 28 is shown to be formed between the nodes 14 and 12, and the radio link 32 is shown to be formed between the nodes 14 and 16. Communication channels defined upon the links form the channels upon which information is communicated between the nodes.

In the exemplary implementation, the nodes form wireless routers capable of routing packet data between the nodes. In the exemplary implementation, a distributed transmission scheduling protocol, NETS (neighborhood established transmission scheduling) protocol is utilized. The scheduling protocol provides for collision free communication of data packets between the nodes. The scheduling protocol provides for the computation of transmission schedules based upon information obtained by individual ones of the nodes about other nodes within two-hop node-neighborhoods of the respective nodes.

The node 14 is here shown to include router circuitry 42 which is operable, amongst other things, to manage communication scheduling, radio resource management, etc. A routing table 44 is coupled to the router circuitry 42. The routing table is, in general, part of a standard IP (internet protocol) stack defined pursuant to the SS7, or other, logical-layer representation of a communication system element.

An RF modem 46 is also coupled to the router circuitry. The RF modem performs modulation and demodulation operations upon data to be communicated by, and data communicated to, the node 14.

An antenna assembly 48 is coupled to the RF mode. The antenna assembly is representative of any of various types of antenna devices, such as sector antenna arrays, a beam forming matrix array capable of exhibiting a steerable-beam radiation pattern and an antenna array in which weighting vectors are applied to individual ones of the antenna elements of the array. Here, the antenna assembly 48 is shown to include a plurality of antenna elements 52 coupled by way of weighting elements 54 to the RF modem. Values of weighting vectors are applied to individual ones of the weighting elements by way of the lines 56. The weighting elements 54 together with other structure (not separately shown) together form a beam forming matrix 58. The elements shown here to form the antenna assembly 48 are exemplary. In other implementations, the antenna assembly 48 is formed of other structure.

The other nodes of the wireless mesh network, such as the nodes 12 and 16 include structure analogous to that shown with respect to the node 14. Such structure can analogously be represented with respect to the other nodes of the wireless mesh network.

During operation of the wireless mesh network, training signals are sent at selected intervals. The training signals sent by the respective nodes are used, e.g., to determine spatial characteristics of the radio links, such as the radio links 28 and 32, formed between pairs of nodes. The spatial characteristics define spatial signatures associated with respective ones of the nodes. For instance, a spatial signature is associated with the node 12 with respect to the node 14, the spatial signatures are utilized by the antenna assembly 48 to cause a selected radiation pattern to be exhibited during communication of data packet between the node 14 and another node, such as the node 12.

When the antenna assembly 48 is formed of other types of antenna devices, other antenna information, other than the spatial signatures of the neighboring nodes and the weight vectors associated with the spatial signatures, is utilized by the antenna assembly. For instance, when the antenna assembly forms a fixed-sector array of antennas, antenna information used by the antenna assembly permits which sector antenna elements of the array should be used to communicate data packets between nodes. That is to say, the antenna information selects the sector antennas capable of exhibiting radiation patterns which encompass a node in which data packets are to be communicated. When the antenna assembly utilizes a steerable-beam approach, the antenna information utilized by the antenna assembly forms neighbor-specific angle information required of the antenna beam pattern to best communicate the data packets between a selected pair of nodes.

Antenna information herein refers to any antenna-specific information to be used by an antenna assembly to facilitate the communication of data packets between a pair of nodes. The antenna information provides directivity to the antenna pattern formed by the antenna assembly, thereby to facilitate communications between nodes of the network. Operation of an embodiment of the present invention provides a manner by which to facilitate storage and use of the antenna information, thereby to facilitate optimal communications in the network.

Also, in the exemplary implementation, IP-formatted data packets are communicated between nodes during communication operations. In other implementations, communication of data formatted in other manners is utilized. The nodes, here, exhibit full TCP/IP protocol suite support, and routing of data is based upon standard IP routing algorithms.

In conventional manner, data packets to be communicated during exemplary operation of the wireless mesh network are formatted to include a header portion and a payload portion.

Figures 3, 4:
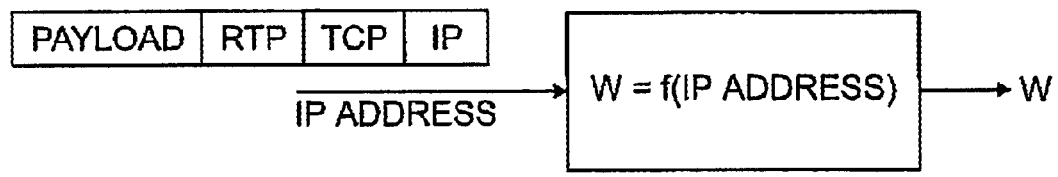
FIG. 3 illustrates a functional representation of operation of an embodiment of the present invention by which to map an IP address forming a portion of a data packet to be communicated pursuant to an embodiment of the present invention to provide antenna information to be used by an antenna assembly positioned at a node of the wireless mesh network shown in FIGS. 1 and 2.
FIG. 4 illustrates a functional representation of a routing table at which mapping performed pursuant to embodiment of the present invention is embodied. In an exemplary implementation of the present invention.

FIG. 3 illustrates a functional element 66 of an embodiment of the present invention to combine a portion of the header information with antenna information, thereby to provide each data packet, or selected data packets of a packet data transmission, with the antenna information. An exemplary data packet 68 is shown in the figure to include a header portion 72 and a payload portion 74. The header portion includes an IP address 74. The IP address of the header portion 74 is functionally applied, here indicated by the arrow 78, to the element 66. Mapping is performed by the element 66, and a mapped output is generated on the line 82. With reference back to FIG. 2, the functional operation is performed by the element 66 are carried out the routing table 44.

FIG. 4 illustrates the routing table 44, here listing IP addresses associated with different nodes of the wireless mesh network. Antenna information associated with the IP address, relative to the node at which the routing table is positioned, is indexed together with the IP address. And, the resultant mapped information is also shown at the routing table. In other implementations, the IP address and the antenna information are combined at other locations and in other manners. Mapping is performed from the IP address to be associated with antenna information. The mapping is realized in the exemplary implementation through a table which relates the IP addresses to corresponding antenna information, such as antenna weights, antenna sectors to be utilized, etc. The table is here shown to be embodied with the IP routing table. In another implementation, the table is separate from the IP routing table. And, in a dynamically-defined wireless mesh network, i.e., a network in which nodes are added to, and subtracted from, the network, the contents of the routing table, and associated antenna information, are appropriately updated. As noted previously, the antenna information is obtained responsive to analysis of training signals transmitted at selected intervals during operation of the network.

Algorithms executable to obtain antenna information, in the exemplary embodiment, are defined in lower-level logical layers, where most efficient, such as at the MAC (medium access control) layer or the PHY (physical) layer. Once the antenna information is determined, or otherwise obtained, the antenna information is communicated to upper-level logical layers to be stored in connection with the routing table, such as the routing table 44. Port specific, antenna information is then attached to a data packet which is to be transmitted, and is communicated back to the lower-level logical layers.

Thereby, the lower-level logical layers are able to be of relatively low complexity. And, while determination of the antenna of the antenna information is implemented in the lower-level logical layers, such as the PHY layer, decisions on when redeterminations of the antenna information are to be made are based, at least in part, upon measurements not available to the PHY layer, such as the link quality determinations. Redetermination decisions are therefore performed at upper-level logical layers. Also, by storing the antenna information in the upper-level logical layers, memory and memory handling operations need not be performed at the lower-level logical layers. In a further implementation, route computation and optimization can be further based upon antenna information, such as to minimize interference to other, i.e. nondestination, nodes or, for example, to enable more efficient STMA scheduling.

Thereby, through operation of an embodiment of the present invention, a manner is provided by which to provide antenna information to be used by a node, or other communication station, to utilize an antenna assembly in a manner by which best to effectuate communication of a data packet.

The preferred descriptions are of preferred examples for implementing the invention, and the scope of the invention should not necessarily be limited by this description. The scope of the present invention is defined by the following claims.

What is claimed is:

1. In a wireless mesh network having a first node, identified by a first identifier, and at least a second node identified by a second identifier, the first node having a first antenna transducer assembly at which to transduce a data packet communicated between the first and the least second nodes, the data packet including values of at least a selected one of the first and second identifiers, an improvement of apparatus for facilitating indication of antenna transducer-related information by which to direct operation of the first antenna transducer assembly to efficiently communicate the data packet between the first and at least second nodes, said apparatus comprising:

a mapper coupled to receive an indication of the values of the selected one of the first and second identifiers included to form a portion of the data packet, said mapper for mapping the values of the selected one of the first and second identifiers to mapped values, the mapped values including values representative of the antenna transducer-related information, and for incorporating the mapped values into the data packet, thereby to identify in the data packet the antenna transducer-related information by which to direct operation of the first antenna transducer assembly.

2. The apparatus of claim 1 wherein the first node comprises a first wireless router and wherein said mapper forms a portion of the first wireless router.

3. The apparatus of claim 1 wherein the second node comprises a second wireless router and wherein said mapper forms a portion of the second wireless router.

4. The apparatus of claim 1 wherein the wireless mesh network is operable pursuant to an IP (internet protocol) protocol, wherein the first identifier comprises a first IP address, wherein the second identifier comprises a second IP address, and wherein said mapper maps values of the selected one of the first and second IP address to the mapped values, the mapped values including both the values of the selected one of the first and second IP addresses and the values representative of the antenna transducer-related information.

5. The apparatus of claim 4 wherein the first node includes a first IP routing table and wherein said mapper forms a portion of the IP routing table.

6. The apparatus of claim 5 wherein the first IP routing table of which said mapper forms a portion relates the selected one of the first and second IP addresses to the values representative of the antenna transducer-related information.

7. The apparatus of claim 1 wherein the first node is defined in terms of logical layers having a physical layer and upper level layers defined thereabove and wherein said mapper is formed at a selected upper level layer of the upper level layers defined above the physical layer.

8. The apparatus of claim 1 wherein the first antenna transducer assembly comprises a first-sector antenna transducer capable of exhibiting at least a first radiation pattern in a first radially-extending sector and wherein the mapped values into which the selected one of the first and second identifiers are mapped by said mapper include indications of which of the first-sector and second-sector antennas are to be used to transduce the data packet.

9. The apparatus of claim 1 wherein the first antenna transducer assembly comprises a first antenna transducer to which a first selected weighting factor can be applied and a second antenna transducer to which a second selected weighting factor can be applied and wherein the mapped values into which the selected one of the first and second identifiers are mapped by said mapper include indications of the first and second weighting factors, respectively, to be applied to the first and second antenna transducers, respectively.

10. The apparatus of claim 1 wherein the first antenna transducer assembly comprises a steerable beam antenna transducer steerable towards a selected radiation-pattern angle and wherein the mapped values into which the selected one of the first and second identifiers are mapped by said mapper include indications of the selected radiation pattern angle into which the steerable beam antenna transducer is to be steered.

11. The apparatus of claim 1 wherein the antenna transducer-related information, of which the mapped values formed by said mapper include as portions thereof, is calculated responsive to transmission of training signals communicated between the first and at least second nodes.

12. In a method for communicating in a wireless mesh network having a first node, identified by a first identifier, and at least a second node, identified by at least a second identifier, the first node having a first antenna transducer assembly at which to transduce a data packet communicated between the first and at least second nodes, the data packet including values of at least a selected one of the first and second identifiers, an improvement of a method for facilitating indications of antenna transducer-related information by which to direct operation of the first antenna transducer assembly to efficiently communicate the communication signals between the first and at least second nodes, said method comprising:

detecting indications of the values of the selected one of the first and second identifiers included to form a portion of the data packet;

mapping the indications detected during said operation of detecting to mapped values, the mapped values including values representative of the antenna transducer-related information; and incorporating the mapped values, formed during said operation of mapping, into the data packet, thereby to identify in the data packet the antenna transducer-related information by which to direct operation of the first antenna transducer assembly.

13. The method of claim 12 wherein the first node comprises a wireless router and wherein said method comprises the additional operation, prior to said operation of detecting, of providing the data packet to the wireless router.

14. The method of claim 13 wherein said operations of detecting, mapping, and incorporating are performed at the wireless router.

15. The method of claim 12 wherein the wireless mesh network is operable pursuant to an IP (internet protocol) protocol, wherein the first identifier comprises a first IP address, wherein the second identifier comprises a second IP address, and wherein said operation of mapping comprises mapping indications of values of the selected one of the first and second IP addresses to the mapped values.

16. The method of claim 15 wherein the first node includes a first IP routing table and wherein said operation of mapping said operation of mapping is performed at the IP routing table.

17. The method of claim 12 wherein the first node is defined in terms of logical layers having a physical layer and upper level layers defined thereabove and wherein said operation of mapping is performed at a selected upper level layer of the upper level layers.

18. The method of claim 12 further comprising the operation prior to said operation of detecting, of selecting the antenna transducer related information.

19. The method of claim 18 further comprising the operation, prior to said operation of selecting, of sending a training sequence between the first and second nodes and wherein said operation of selecting is performed responsive to analysis of the training sequence.

20. The method of claim 12 further comprising the operation of using the mapped values incorporated into the data packet to select operation of the first antenna transducer assembly.

* * * * *